Aug. 16, 1927.                                              1,638,867
                      P. M. MELTON
              COTTON HARVESTER AND CLEANER
               Filed Dec. 27, 1922          3 Sheets-Sheet 2
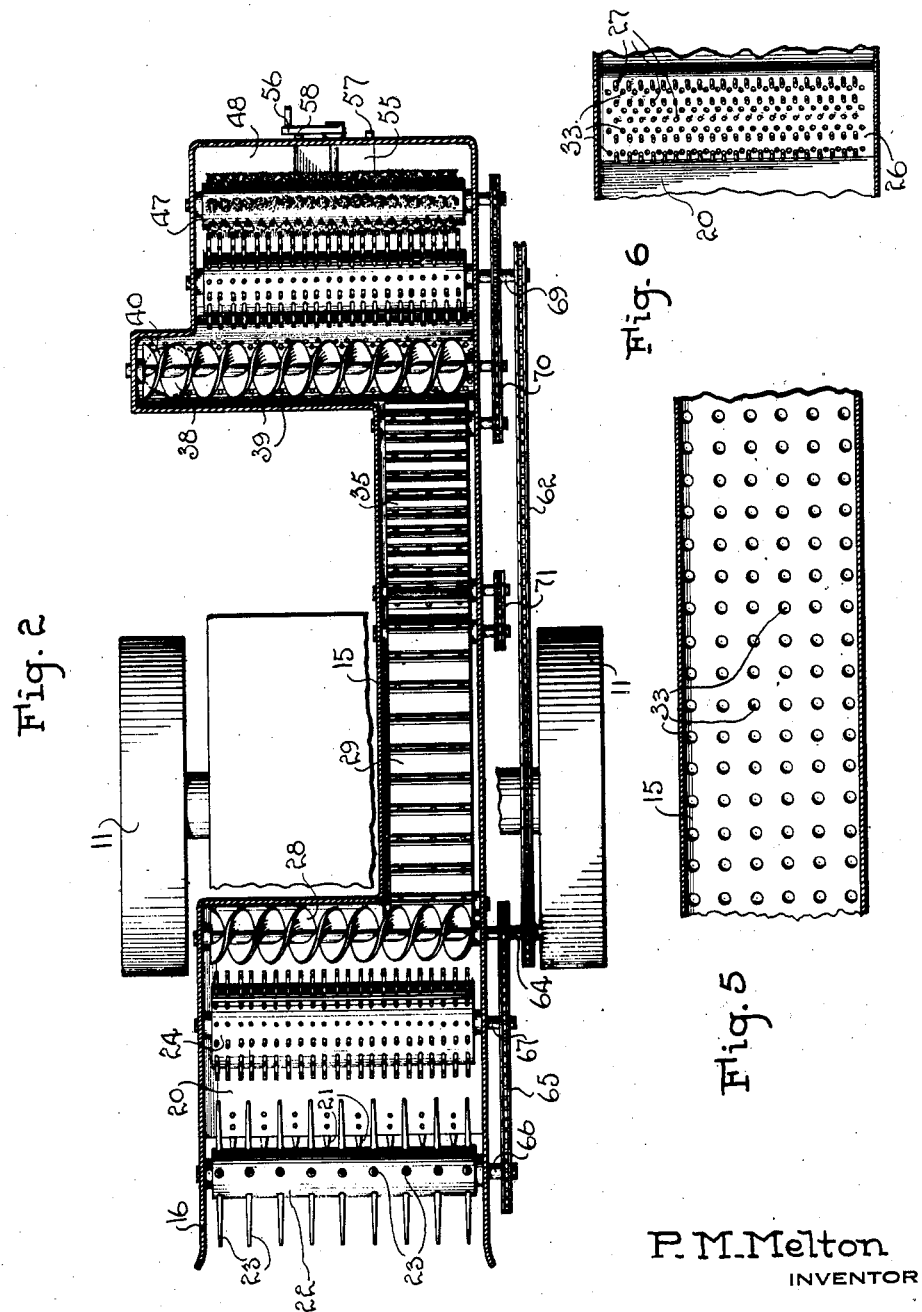
P. M. Melton
INVENTOR

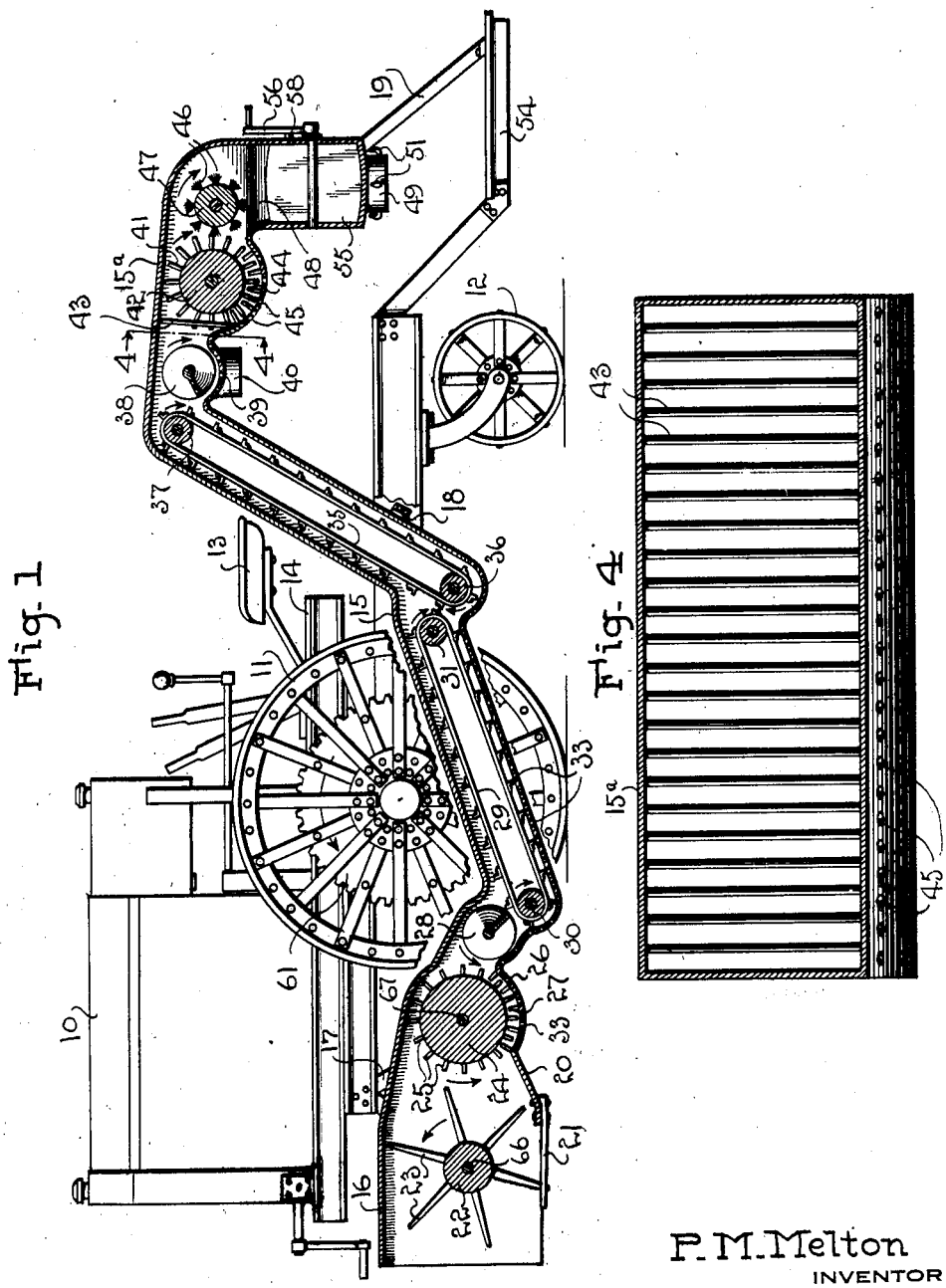

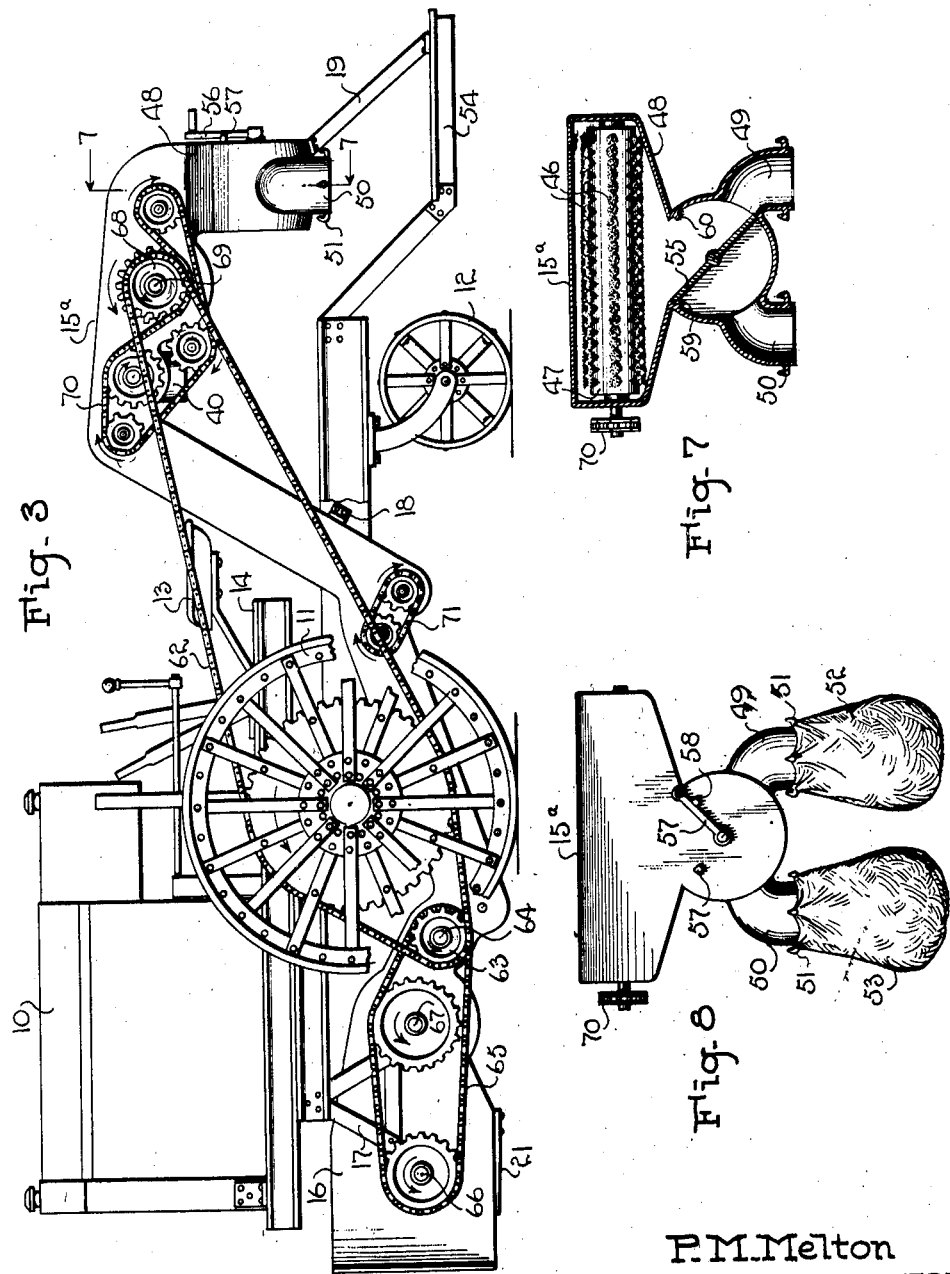

Patented Aug. 16, 1927.

1,638,867

UNITED STATES PATENT OFFICE.

PINK M. MELTON, OF MEMPHIS, TEXAS.

COTTON HARVESTER AND CLEANER.

Application filed December 27, 1922. Serial No. 609,234.

My invention relates to a cotton harvester of the type which strips the bolls from the standing stalks, and while traveling over the field, crushes the bolls, cleans the trash from the cotton, and delivers the latter in clean condition ready for the gin.

One of the important objects of the invention is to provide a harvester of the class described which may be easily mounted on a tractor of conventional type, and which will be efficient in its operation, positively removing all of the cotton from the plant, and at the same time removing all of the hulls and trash therefrom.

A further object of the invention is to provide means which will strip the bolls from the stalk and simultaneously by the same action crush the bolls and deliver the same to suitable cleaning mechanism.

It is also an object of the invention to provide, in connection with a boll harvester and crusher, an improved cleaning mechanism by means of which the dirt and trash are completely removed from the lint and discharged upon the ground while the harvester travels over the field.

With the above and other objects in view, my invention consists in certain details of construction and combinations of parts, the preferred arrangement of which is illustrated in the accompanying drawings.

In the drawings:—

Fig. 1 is a longitudinal vertical section through the invention, showing a portion of the tractor in elevation.

Fig. 2 is a plan view of the invention with the upper wall of the housing and part of the frame structure cut away.

Fig. 3 is a side elevation of the invention.

Fig. 4 is a transverse section on the line 4—4 of Fig. 1.

Fig. 5 is a sectional detail of the conveyer housing.

Fig. 6 is a detail view of one of the concaves.

Fig. 7 is a transverse section on the line 7—7 of Fig. 3.

Fig. 8 is a rear elevation of the delivery end of the cleaning mechanism.

The mechanism which constitutes my invention may be conveniently mounted on a tractor 10 of conventional construction, which, as shown, is provided with two forward wheels 11 and a rear caster wheel 12. A seat 13 is mounted above a platform 14, beneath which a housing 15 is carried, which, at its forward end, is provided with a hood 16 preferably wide enough to span two rows of cotton plants. The housing 15 extends at its rear end upwardly through the frame, as shown at 15ª, where the cleaning mechanism is located and the entire housing and hood is supported from the frame of the tractor by suitable braces or brackets 17, 18 and 19.

The lower wall of the housing is inclined downwardly at its forward end, as shown at 20, and has secured thereto forwardly-extending spaced fingers 21 which receive the cotton stalks therebetween as the harvester travels over the field. The fingers are located at suitable distance above the ground to engage the plant beneath the bolls and this distance may vary according to the normal height of the cotton plants in the region in which the harvester is designed to be used. Above the fingers 21, a roller 22 is journaled in the side walls of the housing, and is provided with radial teeth 23 which revolve between the fingers 21 in the direction indicated by the arrow in Fig. 7, and deliver the branches on which the bolls are borne within range of a cylinder 24 which is provided with radial spikes 25. The cylinder 24 is rotatably mounted in cooperative relation with a concave 26 which constitutes a part of the lower wall of the housing and is provided with upstanding teeth 27 between which the spikes 25 revolve.

It will be seen, therefore, that the revolving fingers 23 and the guide fingers 21 cooperate to feed the branches of the plant into the cylinder and concave, and that the latter cooperate with the feeding means to crush the bolls and strip the cotton from the stalks which are left standing.

As the crushed bolls are carried through the concave, they are delivered to a screw conveyer 28, which conveys the lint and hulls to one side of the machine and onto an endless conveyer 29 which travels on rollers 30 and 31, which are rotatably mounted within the housing 15. The bottom wall of the housing, beneath the conveyers 29 and 28, and concave 26, is provided with perforations 33 through which the dirt and small particles of dried hulls will fall upon the ground. The conveyer 29 delivers the cotton with the remaining portions of the bolls to an endless elevator 35 which travels on rollers 36 and 37, and which delivers the same to another screw conveyer 38 that extends transversely within the upper rear portion 15ª of the housing.

As the cotton lint and bolls are carried transversely by the screw conveyer 38, the remaining small particles of hulls drop through the perforations 39 in the bottom wall of the housing, and the larger particles of trash are finally discharged through the large opening 40 upon the ground. During the passage of the cotton lint and bolls, however, the spikes 41, carried by a rotating cylinder 42, as they revolve, are projected through a grating 43 in rear of the conveyer 38 and engage with the lint, drawing the same through the grating and leaving only the trash to be discharged through the opening 40.

The lint is carried by the revolving spikes 41 through a concave provided with teeth 44, whereby the particles of trash which still adhere to the lint will be separated therefrom and discharged through the perforations 45 in the bottom of the concave. The lint is removed from the spikes 41 by doffing brushes 46 carried by a rotating roller 47, and thereby delivered into a chute 48 at the rear end of the machine, the chute having two branches 49 and 50 provided with hooks 51 for the attachment of cotton receiving bags 52 and 53, which may be supported by a platform 54 forming a rearward extension to the frame of the tractor.

The cotton, as it is discharged from the chute, may be discharged into either one of the branches 49 or 50 by means of a gate 55 which is provided with a crank 56 or other means for rocking the same. Lugs 57 and 58 are provided on the outside of the chute for stopping the handle at either limit of its movement, and preferably ribs 59 and 60 are provided within the chute for limiting the movements of the gate.

The above described mechanism may be driven in any suitable manner from the motor or from one of the traction wheels.

In the drawings, I have shown a sprocket wheel 61 secured to the axle adjacent one of the traction wheels 11, and this sprocket wheel drives a sprocket chain 62 which extends around a sprocket wheel 63 on a shaft 64 on which the screw conveyer 28 is secured. From the shaft 64, suitable sprocket gearing 65 drives the shafts 66 and 67, on which the roller 22 and spiked cylinder 24 are mounted. The sprocket chain 62 also extends rearwardly around a sprocket wheel 68 mounted on the shaft 69, which carries the rotating cylinder 42. By means of sprocket gearing 70 which is reversely driven from the shaft 69, the elevator 35, screw conveyer 38 and doffing roller 47 are driven. The rollers 31 and 36 are also connected by sprocket gearing, as shown at 71, whereby the conveyer 29 is driven.

From the foregoing description, it will be understood that as the harvester is driven over the field, the cotton bolls from two adjacent rows of plants are stripped and crushed by the cooperative action of the guide fingers 21, revolving fingers 23, spiked cylinder 24 and concave 26. The lint and bolls are then conveyed to one side of the machine by means of the screw conveyer 28, where they are delivered upon the endless conveyer 29 which conveys them rearwardly, to the elevator 35, the small particles of hulls and dirt being in the meantime discharged upon the ground through the perforations 33. The lint and remaining particles of bolls are then delivered by the elevator to the transversely-extending screw conveyer 38, whereby they are conveyed laterally in front of the grating 43 through which the lint is drawn by the spikes 41 carried by the revolving roller 42, the trash being discharged upon the ground through the perforations 39 and the large opening 40 at the delivery end of the conveyer 38. The lint is further cleaned between the spikes 41 and 44, and the remaining particles of trash discharged through the perforations 45, the clean lint being removed from the spiked cylinder by the doffing brushes 46 and delivered to one or the other of the bags 52 and 53, depending upon the position of the gate 55.

For the sake of illustrating the principles of my invention, I have shown and described specifically one arrangement by means of which the invention may be embodied. It will be understood, however, that numerous modifications may be made in the mechanical details thereof without departing from the principles of the invention as defined by the claims.

What is claimed is:—

1. In a cotton harvester, the combination of a housing having top, bottom and side walls and open at its front end and having spaced guide fingers projecting forwardly from its bottom wall, a transverse horizontal roller rotatably mounted directly above the guide fingers and having radially projecting fingers to draw the branches of stalks rearwardly, the axis of said roller being in advance of the front edge of said bottom wall, and a spiked roller and concave immediately in rear of said radially projecting fingers and cooperating therewith to detach and crush the bolls.

2. In a cotton harvester, the combination of a frame having forwardly projecting spaced guide fingers, a transverse horizontal roller rotatably mounted directly above the guide fingers and having radially projecting fingers to draw the branches of stalks rearwardly, the spaces between said guide fingers terminating in rear of the rear surface of said roller, and a spiked roller and concave immediately in rear of said radially projecting fingers and cooperating therewith to detach and crush the bolls, said concave having perforations therethrough for permitting dirt and small particles of hulls to be discharged upon the ground.

3. In a cotton harvester, the combination of a hood having spaced guide fingers projecting forwardly from its under side, a transverse horizontal roller rotatably mounted above the guide fingers and having radially projecting fingers disposed in radial planes between the guide fingers, said radially projecting fingers in the lower part of their orbit extending below the plane of said guide fingers, and a spiked roller and concave immediately in rear of said radially projecting fingers and cooperating therewith to detach the bolls from the stalks.

4. In a cotton harvester, the combination of a hood having guide fingers projecting forwardly from its under side, a transverse roller mounted to rotate about a horizontal axis above the guide fingers and having fingers projecting radially therefrom in vertical planes perpendicular to the axis of the roller and between the guide fingers, means for rotating said roller with the radially projecting fingers carried thereby, said roller being so located that the radially projecting fingers in the lower part of their orbit extend below the plane of said guide fingers to draw the branches of stalks rearwardly, and a spiked roller and concave immediately in rear of said radially projecting fingers and cooperating therewith to detach and crush the bolls.

5. In a cotton harvester, the combination of a housing having top, bottom and side walls and open at its front end, the top and side walls of the housing being continued forwardly beyond the bottom wall thereof to form a hood, means within the hood and in advance of the front edge of said bottom wall for drawing the branches of standing cotton plants rearwardly within the hood, a spiked concave in rear of said means, a spiked cylinder in cooperative relation to the concave, and means to rotate said cylinder in a direction to carry its spikes downwardly and rearwardly between the spikes of the concave and in cooperation with the first mentioned means to detach and crush the bolls.

6. In a cotton harvester, the combination of a housing having top, bottom and side walls and open at its front end, said top and side walls being continued forwardly beyond the bottom wall to form a hood, fingers extending forwardly from the front edge of said bottom wall beneath the hood, rotatable means within the hood and directly above said fingers for drawing the branches of cotton plants upwardly and rearwardly between said fingers and into the housing, a spiked concave in rear of said rotatable means, a spiked cylinder above and concentric with the concave, means to rotate said cylinder in a direction to carry its spikes downwardly and rearwardly between the spikes of the concave and in cooperation with said rotatable means to detach and crush the bolls, and means for subsequently separating the lint from the trash and discharging the trash upon the ground.

7. In a cotton harvester, the combination of a housing having a concave in the bottom thereof at the forward end, a spiked cylinder revolving within the concave, fixed fingers and revoluble fingers in front of the concave operable to feed thereinto the branches and bolls of standing cotton plants, as the machine travels over the field, whereby the bolls are detached from the plants and crushed, and means for subsequently separating the lint from the trash and discharging the trash upon the ground.

8. In a cotton harvester, the combination of a housing having a concave extending transversely of the bottom thereof at the forward end, a spiked cylinder revolving within the concave, fixed fingers and revoluble fingers in front of the concave operable to feed thereinto the branches and bolls of standing cotton plants, whereby the bolls are detached from the plants and crushed, a transverse conveyer immediately in rear of the spiked cylinder to receive the lint and crushed bolls therefrom and convey the same to one side of the machine, means for receiving the lint and crushed bolls from the transverse conveyor, conveyor means for conveying the lint and crushed bolls rearwardly, and means for separating the trash from the lint.

In testimony, that I claim the foregoing as my own, I have hereto affixed my signature.

PINK M. MELTON.